United States Patent

[11] 3,616,879

| [72] | Inventor | Maurice P. Pauwels<br>South Bend, Ind. |
|---|---|---|
| [21] | Appl. No. | 878,475 |
| [22] | Filed | Nov. 20, 1969 |
| [45] | Patented | Nov. 2, 1971 |
| [73] | Assignee | The Bendix Corporation |

[54] CALIPER HOUSING RETAINING SPRING KEY
8 Claims, 4 Drawing Figs.

[52] U.S. Cl. .................................................... 188/73.6,
188/73.3
[51] Int. Cl. ..................................................... F16d 55/18,
F16d 65/00
[50] Field of Search .......................................... 188/72.4,
73.3, 73.6

[56] References Cited
UNITED STATES PATENTS

| 3,220,512 | 11/1965 | Coatalen ...................... | 188/72.4 |
| 3,368,647 | 2/1968 | Laverdant ..................... | 188/73.3 |
| 3,403,756 | 10/1968 | Thirion ......................... | 188/73.3 |
| 3,414,090 | 12/1968 | Hambling ...................... | 188/73.3 |

Primary Examiner—Duane A. Reger
Attorneys—C. F. Arens and Plante, Arens, Hartz, Smith and Thompson ABSTRACT: A disc brake including a fixed support having a pair of circumferentially spaced arms defining a recess therebetween. Each of the arms has an axially extending groove formed therein which slidably receives a projecting ledge on a caliper which is slidably supported in the recess by the arms. Removable keys are carried in the grooves that engage the caliper to retain the latter on the fixed support.

PATENTED NOV 2 1971 3,616,879

INVENTOR.
MAURICE P. PAUWELS
BY
Plante, Arens, Hartz, Smith & Thompson
ATTORNEYS

CALIPER HOUSING RETAINING SPRING KEY

BACKGROUND OF THE INVENTION

This invention relates to a disc brake for an automotive vehicle.

Disc brakes of the type having a caliper slidably mounted on a U-shaped fixed support that straddles the rotor have become increasingly popular in recent years. Such a brake is shown in U.S. Pat No. 3,403,756 to Thirion, licensed to the assignee of the present invention. In the Thirion patent, a disc brake of the above-mentioned type provides a pair of keys disposed between the fixed support and the caliper, the latter of which is urged toward the keys by a pair of resilient clips. The friction pads are readily serviceable in this type of brake since the caliper may be removed from the fixed support without first removing the fixed support from the vehicle. Another advantage of the Thirion brake is that the braking torque is taken exclusively by the fixed support. Although this design possesses many advantages over prior art disc brakes, the brake does require a number of parts, which of course, increases its cost.

SUMMARY OF THE INVENTION

Therefore, an important object of my invention is to reduce the cost of a brake of the aforementioned type by substantially reducing the number of parts required.

Another important object of my invention is to provide a brake in which the caliper may be removed from the fixed support by merely withdrawing a pair of keys from a pair of corresponding grooves in the fixed support.

DETAILED DESCRIPTION

Figure 1:
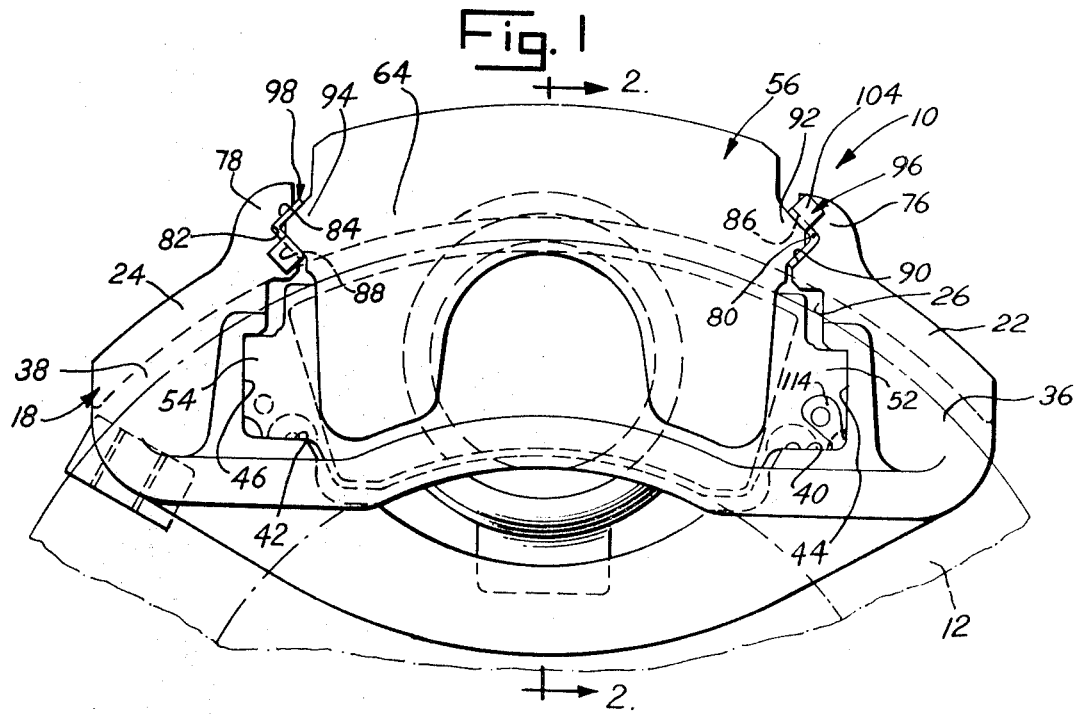
FIG. 1 is a side elevational view of a brake made pursuant to my present invention.
Figure 2:
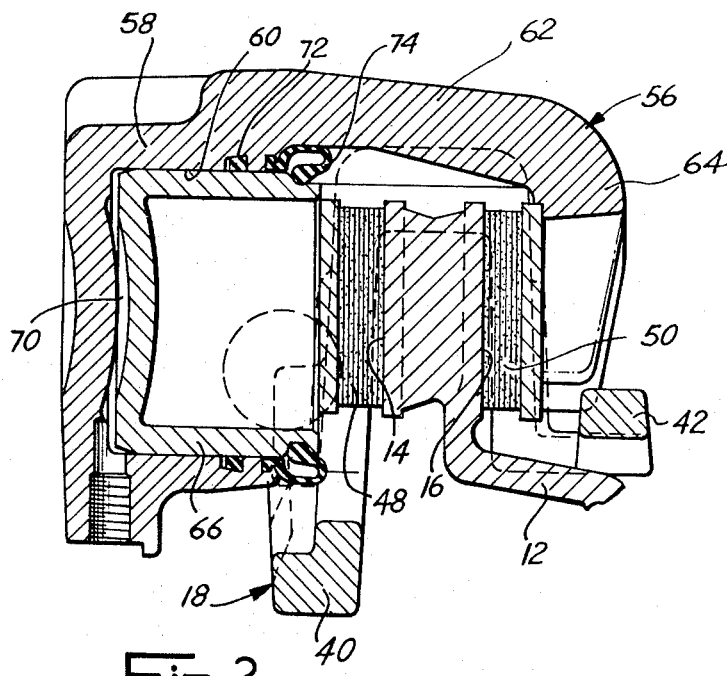
FIG. 2 is a cross-sectional view taken along lines 2—2 of FIG. 1.
Figure 3:
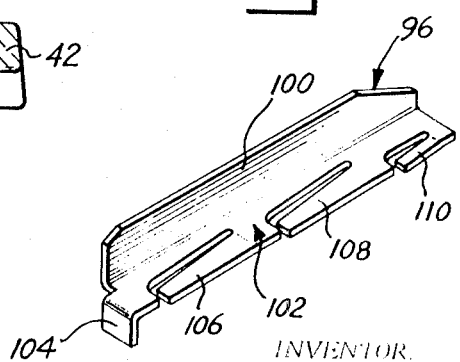
FIG. 3 is a perspective view of a key used to assemble the brake illustrated in FIGS. X1 and 2.

Referring now to the drawings, a disc brake 10 includes a rotor 12 having a pair of opposite friction faces 14 and 16 on opposite sides thereof. The rotor 12 is mounted in the usual manner for rotation with a member to be braked (not shown). A torque member 18 is secured to a non-rotative part of the vehicle, such as the axle flange (not shown) by inserting bolts through the openings 20. The torque member 18 includes a pair of circumferentially spaced arms 22, 24 defining a recess 26 therebetween exposing a portion of each of the friction faces 14, 16. Each of the arms 22, 24 includes a first section 28, 30 extending generally parallel to the friction face 14, a second section 32, 34 extending parallel to the axis of rotation of the rotor 12 and straddling the latter, and a third section 36, 38 that extends generally parallel to the other friction face 16. The arms 22, 24 are interconnected by a pair of horizontally extending portions 40, 42 of the torque member 18 which are disposed on opposite sides of the rotor 12, as is best seen in FIG. 2. The inner, vertically extending edges of the arms 22, 24 are provided with notches 44, 46. A pair of friction elements 48, 50 are slidably supported adjacent the friction faces 14, 16 by a pair of lugs 52, 54 extending from the opposite sides of each of the friction elements 48, 50 which are received in notches 44 and 46, respectively.

A caliper 56 is disposed in the recess 26 and is slidable with respect to the torque member 18. Caliper 56 includes a housing 58 defining a bore 60 therewithin, a bridge portion 62 that straddles the rotor 12, and a radially inwardly extending portion 64 which engages the friction element 50. A piston 66 is slidable in the bore 60 and engages the other friction element 48. The usual fluid inlet 68 is provided to communicate pressurized brake fluid into a chamber 70 defined by the rear face of the piston 66 and the walls of the bore 60. A seal 72 is provided between the piston 66 and the bore 60 to prevent brake fluid from escaping from the chamber 70. A flexible boot 74 is provided to exclude contaminant from the bore 60.

A pair of extensions 76, 78 project from the arms 22, 24, respectively, circumferentially toward each other along the periphery of the rotor 12. Each of the extensions 76, 78 is provided with a groove 80, 82 therein, which extends through the extensions 76, 78 parallel to the axis of rotation of the rotor 12. Each of the grooves 80, 82 has upper sides 84, 86 and lower sides 88, 90 that intersect to present a groove with a V-shaped cross section that opens into a recess 26. A pair of axially extending ledges 92, 94 are formed integrally with the bridge piece 62 of the caliper 56. The ledges 92, 94 have a generally V-shaped cross section and are adapted to be received in the corresponding grooves 80, 82, respectively. A pair of keys 96, 98 are installed in the grooves 80, 82 and engage corresponding ledges 92, 94, respectively, to retain the caliper 56 on the torque member 18.

Figure 4:
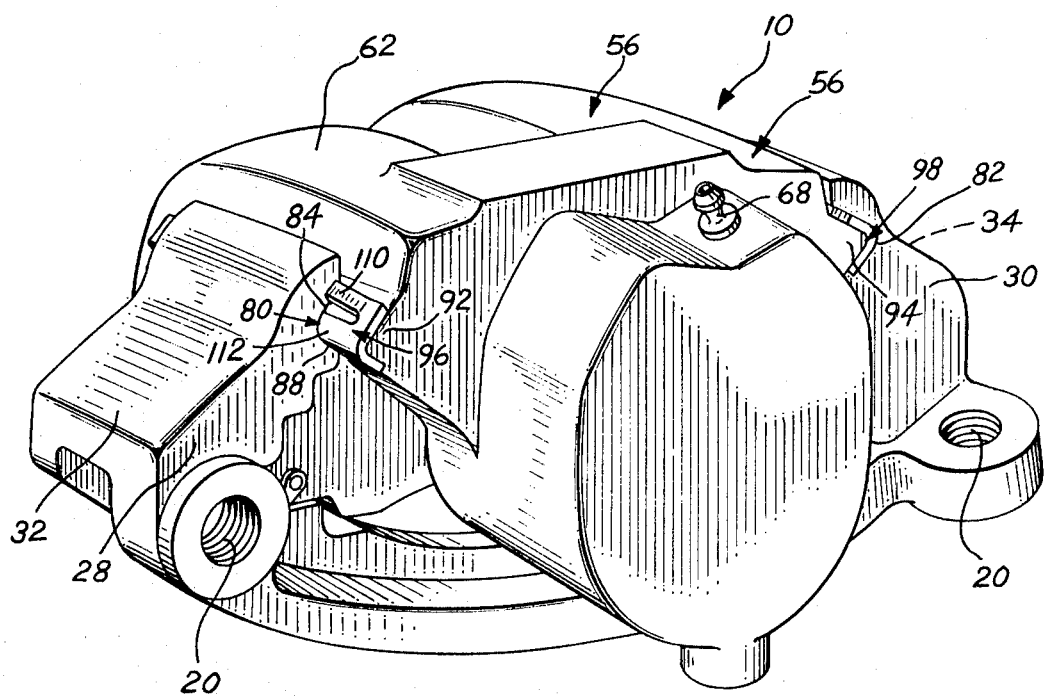
FIG. 4 is a perspective view of the brake illustrated in FIGS. 1 and 2, illustrating the side of the brake not shown in FIG. 1.

Since key 98 is identical to key 96, only the latter will be described in detail. Key 96 includes a pair of intersecting legs 100, 102 disposed at substantially right angles to one another. A tab 104 extends from the leg 102 to facilitate removal of the key when it is installed in the brake. Resilient fingers 106, 108 and 110 project from the leg 102 and are adapted to yieldably urge the caliper toward the fixed support when the keys and the caliper are installed thereon. Key 96 is substantially longer than the length of its corresponding groove 82 to present a portion 112 that projects from the fixed support 18. The outer end of the finger 110 projects outwardly from the projecting portion 112. As best seen in FIG. 4, the outer end of the finger 110 is adapted to engage the vertically extending section 28 of the arm 22 to retain the key in its proper positions when the latter is installed in the brake. Key 96 is inserted in the groove 80 with the leg 100 which carries the fingers 106, 108 and 110 disposed adjacent the upper side 84 of the groove 80 whereas the key 98 is inserted in the groove 82 with its leg 100 disposed adjacent the lower side 90 of the groove 82. Therefore, the fingers 106 and 108 on the key 96 will urge the caliper 52 radially outwardly with respect to the rotor while the corresponding fingers of the key 98 will urge the caliper 52 radially inwardly with respect to the rotor, to insure that the caliper 56 will be tightly retained on the torque member 18.

Show antirattle springs 114 are provided between the torque member 18 and the friction elements 48 and 50 to prevent the latter from rattling. Springs 114 are of the type disclosed in copending application, Ser. No. 862,755 filed Oct. 1, 1969 licensed to the assignee of the present invention.

MODE OF OPERATION

To apply the brakes, the vehicle operator depresses the usual pedal in the operator's compartment which develops pressure in the master cylinder connected thereto. Fluid is forced into the chamber 70 through the inlet 68, and urges the piston 66 and the friction element 48 associated therewith toward the friction face 14 on the rotor 12. Those skilled in the art will recognize that since the caliper 56 is slidable with respect to the torque member 18, reaction forces acting through the caliper 56 will also urge the friction element 50 toward the friction face 16 of the rotor 12. Engagement of the friction elements 48, 50 with the friction faces 14, 16 retards rotation of the rotor 12, thereby stopping the vehicle. It should be noted that as the brake is applied, ledges 92 and 94 slide along the legs 100, 102 of their corresponding keys 96 or 98. The fluid pressure developed in the chamber 70 acting on the piston easily overcomes the friction forces of the various members during the relatively small axial movement of the caliper.

When it is necessary to disassemble the brake such as for example, when wear of the friction elements 48, 50 necessitates their replacement, an appropriate tool is used to deflect the outer end of the fingers 110 on the keys 96 and 98 out of engagement with the vertically extending sections 28 or 30 of the arms 22 and 24 to substantially align the outer end of the fingers 110 with leg 102 of the corresponding key 96 or 98. The keys 96, 98 may then be removed from the grooves 80 or 82 by engaging an appropriate tool with the tabs 104 to pull the keys out of the grooves in a direction substantially parallel to the axis of the rotation of the rotor 12. After removal of the keys 96 and 98, the caliper 56 may be removed by rotating the ledges 92, 94 out of the grooves 80, 82 and then lifting the caliper from the torque 18 radially outwardly with respect to the rotor 12, permitting replacement of the friction elements 48, 50. The brake may then be reassembled by replacing the caliper 56 on the torque member 18, and then installing the keys 96 and 98 in their corresponding grooves 80 or 82. The finger 110 may then be deflected so that their outer ends engage their corresponding vertically extending section 28 or 30.

I claim:

1. In a disc brake:
a rotor having a pair of friction face;
a pair of friction elements, one disposed adjacent each of said friction faces;
a support member having a pair of circumferentially spaced arms defining a recess therebetween;
a caliper member slidable in said recess bridging said rotor;
said caliper member being operatively connected to each of said friction elements;
one of said members having groove means formed therein;
the other of said members having outwardly projecting ledge means slidably received in said groove means; and
a resilient member carried in said groove means engaging said ledge means for urging the caliper member toward said support member;
said groove means having a pair of intersecting sides extending through said one member;
said resilient member being a V-shaped key presenting a pair of intersecting legs;
each of said legs engaging a corresponding one of said sides.

2. The invention of claim 1:
said groove means being formed in said support member and extending therethrough in a direction substantially parallel to the axis of rotation of said rotor.

3. The invention of claim 2:
one of said legs having resilient fingers formed therein;
said fingers urging the caliper toward said fixed support.

4. The invention of claim 3:
said key having an axial length greater than that of the groove to present a portion projecting from said one member;
one of said legs having resilient fingers projecting therefrom;
one of said fingers projecting from said portion and engaging the side of said fixed support to prevent movement of the key in a direction parallel to the axis of rotation of the rotor.X;
the other fingers engaging said caliper member for urging the latter toward the fixed support.

5. In a disc brake:
a rotor having a pair of friction faces;
a pair of friction elements, one disposed adjacent each of said friction faces;
a support member having a pair of circumferentially spaced arms defining a recess therebetween;
a caliper member slidable in said recess bridging said rotor;
said caliper being operatively connected to each of said friction elements;
one of said members having groove means formed therein;
the other of said members having outwardly projecting ledge means slidably received in said groove means; and
a resilient member carried in said groove means engaging said ledge means for urging the caliper member toward said support member;
said groove means being a pair of circumferentially spaced grooves formed in the support member extending generally parallel to the axis of rotation of the rotor;
said grooves having upper and lower intersecting sides to present V-shaped channels through said one member;
there being a pair of said resilient members, one of said resilient members being disposed in each of said grooves;
said resilient members being V-shaped keys presenting a pair of intersecting legs;
one leg of each of said keys having resilient fingers projecting therefrom;
said one leg of one of said keys being disposed between the upper side of one of said grooves and the corresponding side of the caliper whereby the resiliency of the fingers urges said corresponding side of the caliper radially inwardly with respect to the rotor;
said one leg of the other key being disposed between the lower side of the other groove and the other side of the caliper whereby the resiliency of said fingers urges said other side of said caliper radially outwardly with respect to the rotor.

6. In a disc brake:
a rotor having a pair of friction faces;
a pair of friction elements, one of said friction elements being disposed adjacent each of said friction faces;
a support member;
a caliper member slidably mounted on said support member and extending across the periphery of the rotor, said caliper member engaging each of said friction elements for urging the latter into braking engagement with their corresponding friction faces when a brake application is effected;
groove means having upper and lower surfaces provided in one of said members;
ledge means having upper and lower surfaces extending from the other member and received within said groove means; and
removable means disposed between said groove means and said ledge means for retaining the caliper member on the support member;
said removable means having upper and lower interconnected legs, the upper leg being disposed between the upper surface of the ledge means and the upper surface of the groove means, the lower leg being disposed between the lower surface of the ledge means and the lower surface of the groove means.

7. The invention of claim 6:
said removable means being removable from between said caliper member and said support member in a direction generally parallel to the axis of rotation of the rotor to permit said caliper member to be removed from said support member radially outwardly with respect to said rotor.

8. The invention of claim 7:
one of said legs having resilient fingers provided thereon to urge said caliper member toward said support member.

* * * * *